US011616356B2

(12) United States Patent
Dye et al.

(10) Patent No.: US 11,616,356 B2
(45) Date of Patent: Mar. 28, 2023

(54) MECHANICAL SPARK CONTAINMENT FOR DISCONNECTOR

(71) Applicant: Hubbell Incorporated, Shelton, CT (US)

(72) Inventors: Justin Lee Dye, Canton, OH (US); Bastiaan Hubertus van Besouw, Strongsville, OH (US); Sidharth Suresh Iyer, Wadsworth, OH (US); Xingniu Huo, Medina, OH (US)

(73) Assignee: Hubbell Incorporated, Shelton, CT (US)

( * ) Notice: Subject to any disclaimer, the term of this patent is extended or adjusted under 35 U.S.C. 154(b) by 59 days.

(21) Appl. No.: 17/154,545

(22) Filed: Jan. 21, 2021

(65) Prior Publication Data
US 2021/0234359 A1    Jul. 29, 2021

Related U.S. Application Data

(60) Provisional application No. 62/965,359, filed on Jan. 24, 2020.

(51) Int. Cl.
| | |
|---|---|
| *H01C 7/12* | (2006.01) |
| *H02H 1/00* | (2006.01) |
| *H02H 1/04* | (2006.01) |
| *H02H 3/22* | (2006.01) |
| *H02H 9/06* | (2006.01) |
| *H02H 3/08* | (2006.01) |

(52) U.S. Cl.
CPC ..................... *H02H 3/08* (2013.01)

(58) Field of Classification Search
CPC ....................................................... H02H 3/08

USPC ......................................................... 361/118
See application file for complete search history.

(56) References Cited

U.S. PATENT DOCUMENTS

| | | |
|---|---|---|
| 3,214,624 A | 10/1965 | Misare |
| 5,652,690 A * | 7/1997 | Mansfield ............... H01C 7/12 361/127 |
| 2003/0044740 A1 | 3/2003 | Brooker |

(Continued)

FOREIGN PATENT DOCUMENTS

DE    102012016847    2/2014

OTHER PUBLICATIONS

PCT/US2021/014375 International Search Report and Written Opinion dated Apr. 14, 2021 (14 pages).

*Primary Examiner* — Jared Fureman
*Assistant Examiner* — Lucy M Thomas
(74) *Attorney, Agent, or Firm* — Michael Best & Friedrich LLP

(57) ABSTRACT

In one aspect, the application provides an electrical system including a conductor, a ground, an arrester electrically connected to the conductor, and a disconnector assembly electrically connected between the arrester and the ground. The disconnector assembly includes an isolator configured to perform an operating function in response to the occurrence of an event and a housing configured to surround the isolator. The isolator includes a first terminal electrically connected to the arrester by a first wire and a second terminal electrically connected to the ground by a second wire. The housing includes a first opening through which the first terminal extends, a second opening through which the second terminal extends, and a retention mechanism configured to hold the isolator in place relative to the arrester.

13 Claims, 6 Drawing Sheets

(56) References Cited

U.S. PATENT DOCUMENTS

2005/0088795 A1    4/2005  Lenk et al.
2020/0373113 A1*  11/2020  Koch .................... H01C 7/126

* cited by examiner

MECHANICAL SPARK CONTAINMENT FOR DISCONNECTOR

RELATED APPLICATIONS

This application claims the benefit of U.S. Provisional Patent Application No. 62/965,359, filed Jan. 24, 2020, the entire content of which is hereby incorporated by reference.

FIELD

Embodiments relate to mechanical spark containment for a disconnector assembly.

SUMMARY

Electrical systems include protective devices, such as arresters, designed to protect electrical equipment from power surges that are caused by events such as lightning strikes or switching events. These protective devices may include fail safes such as disconnector devices that are designed to operate by isolating the protective device from the electrical grid upon the occurrence of certain events, such as an arrester failing and creating a low impedance fault.

In one aspect, the application provides an electrical system including a conductor, a ground, an arrester electrically connected to the conductor, and a disconnector assembly electrically connected between the arrester and the ground. The disconnector assembly includes an isolator configured to perform an operating function in response to the occurrence of an event and a housing configured to surround the isolator. The isolator includes a first terminal electrically connected to the arrester by a first wire and a second terminal electrically connected to the ground by a second wire. The housing includes a first opening through which the first terminal extends, a second opening through which the second terminal extends, and a retention mechanism configured to hold the isolator in place relative to the arrester.

In another aspect, the application provides a disconnector assembly including an isolator configured to perform an operating function in response to the occurrence of an event, a washer disposed at a top surface of the isolator, and a housing configured to surround the isolator. The isolator includes a first terminal electrically connected to a protective device by a first wire and a second terminal electrically connected to a ground by a second wire. The housing includes a first opening through which the first terminal extends, a second opening through which the second terminal extends, and a gripping mechanism configured to engage the washer with a compressive force before the operating function occurs.

In another aspect, the application provides an electrical system including a conductor, a ground, an arrester electrically connected to the conductor, and a disconnector assembly electrically connected between the arrester and the ground. The disconnector assembly includes an isolator including a first terminal electrically connected to the arrester, a second terminal electrically connected to the ground, and an explosive material configured to explode when an electrical parameter of the isolator exceeds a threshold associated with an electrical failure of the arrest. The disconnector assembly further includes a housing configured to surround the isolator, the housing including a first opening through which the first terminal extends, a second opening through which the second terminal extends, and a mechanism configured to close the first opening when the explosive material explodes.

Other aspects of the invention will become apparent by consideration of the detailed description and accompanying drawings.

DETAILED DESCRIPTION

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more electronic processors, such as a microprocessor and/or application specific integrated circuits ("ASICs"). As such, it should be noted that a plurality of hardware and software-based devices, as well as a plurality of different structural components, may be utilized to implement the embodiments. For example, "servers," "computing devices," "controllers," "processors," etc., described in the specification can include one or more electronic processors, one or more computer-readable medium modules, one or more input/output interfaces, and various connections (e.g., a system bus) connecting the components.

Figure 1:
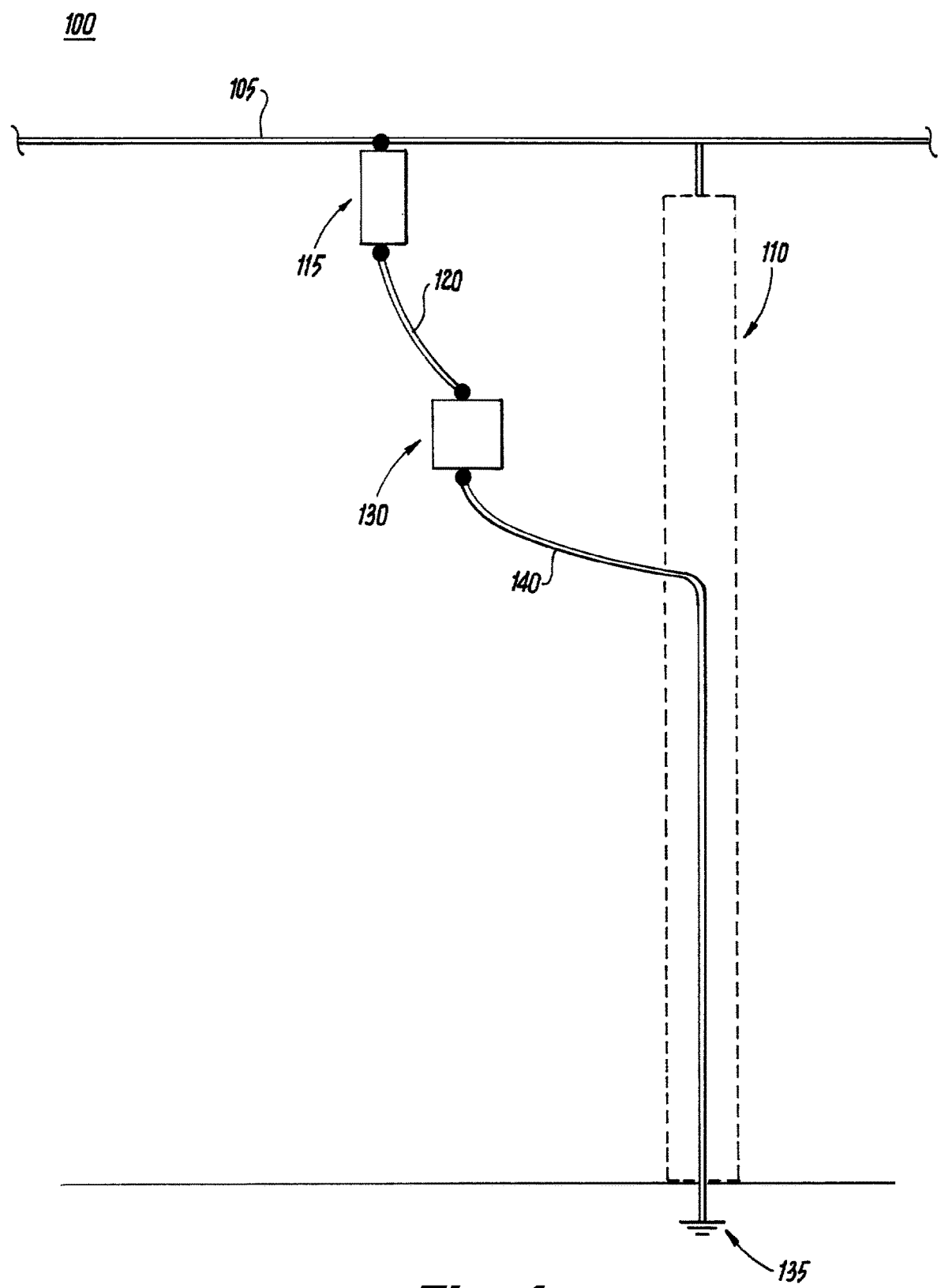
FIG. 1 is a schematic view of an electrical system according to one embodiment.

FIG. 1 illustrates an electrical system 100 according to some embodiments of the disclosure. The electrical system 100 includes a conductor 105. The conductor 105 may be, for example, an overhead electrical grid line, a hot-line, a phase line, or the like. The conductor 105 may be supported by and mechanically coupled to a pole 110. The pole 110 may be, for example, a wooden distribution pole, a transmission tower, a "smart pole," a substation structure, an electrical cabinet, or the like.

The electrical system 100 may further include a protective device, such as arrester 115, that is electrically connected to the conductor 105. The arrester 115 may be any known type of arrester. An electrical wire 120 electrically connects the arrester 115 to a disconnector assembly 130. The disconnector assembly 130 may be connected in series with the arrester 115 and is electrically connected to ground 135 by a ground wire 140. In some embodiments, the ground wire 140 may be mounted or otherwise mechanically coupled to the pole 110. In such embodiments, the ground wire 140 may run along the length of the pole 110 to ground 135. In some embodiments, the ground wire 140 is not fixed to the pole 110 and is supported by some other structure.

Figure 2:
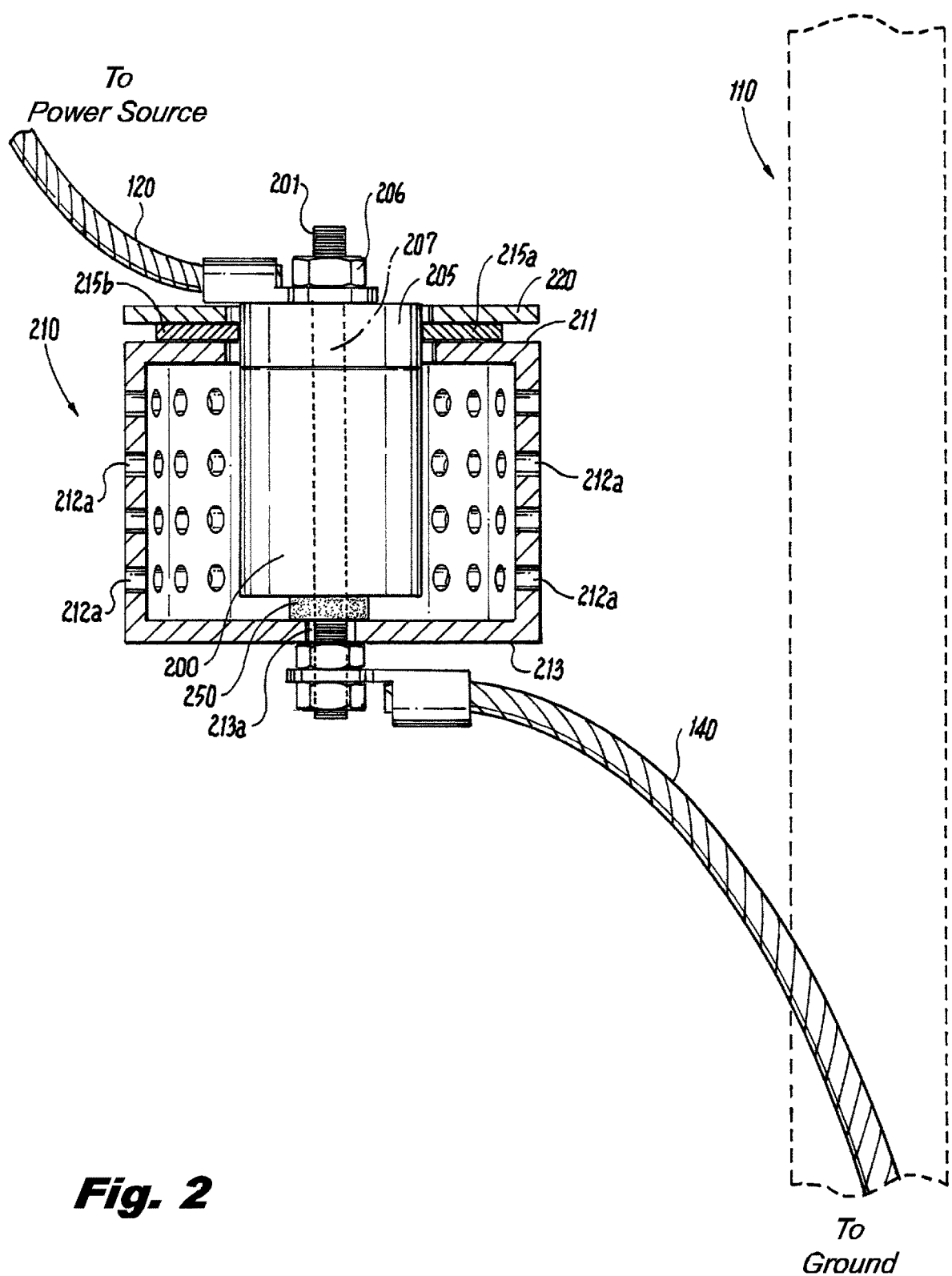
FIG. 2 is a side view of a disconnector assembly included in the electrical system of FIG. 1 according to one embodiment.
Figure 3:
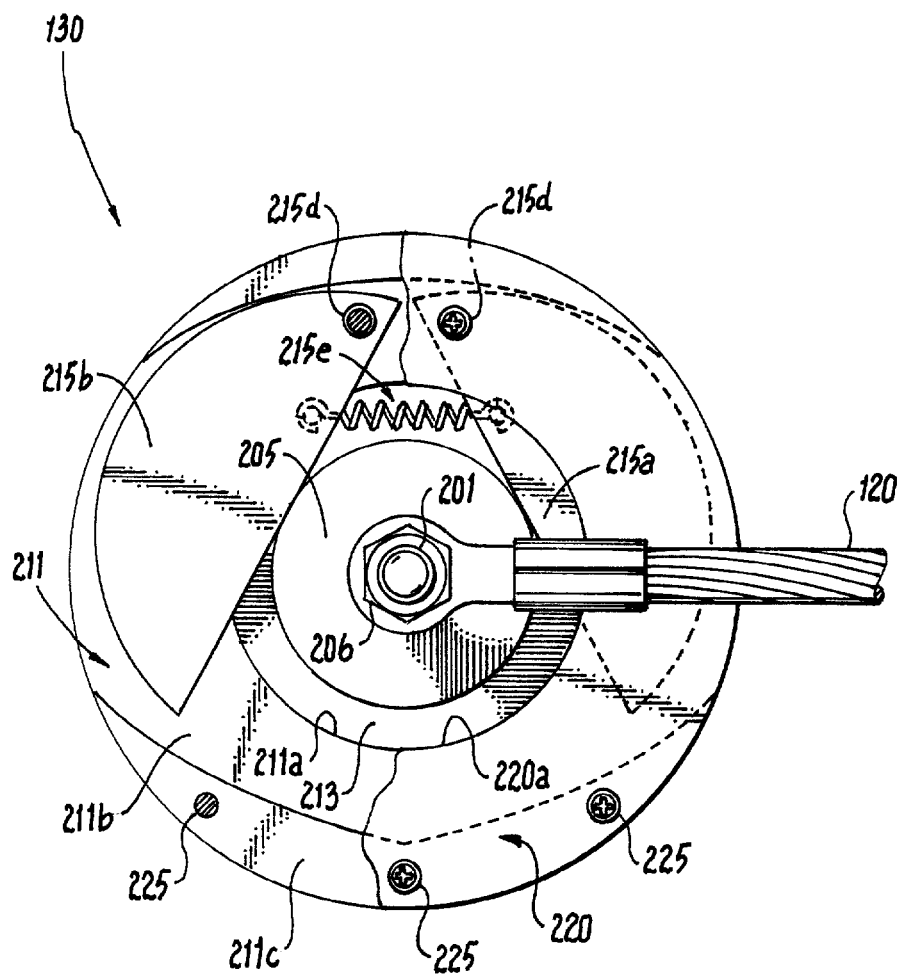
FIG. 3 is a top view of a disconnector assembly included in the electrical system of FIG. 1 according to one embodiment.
Figure 4:
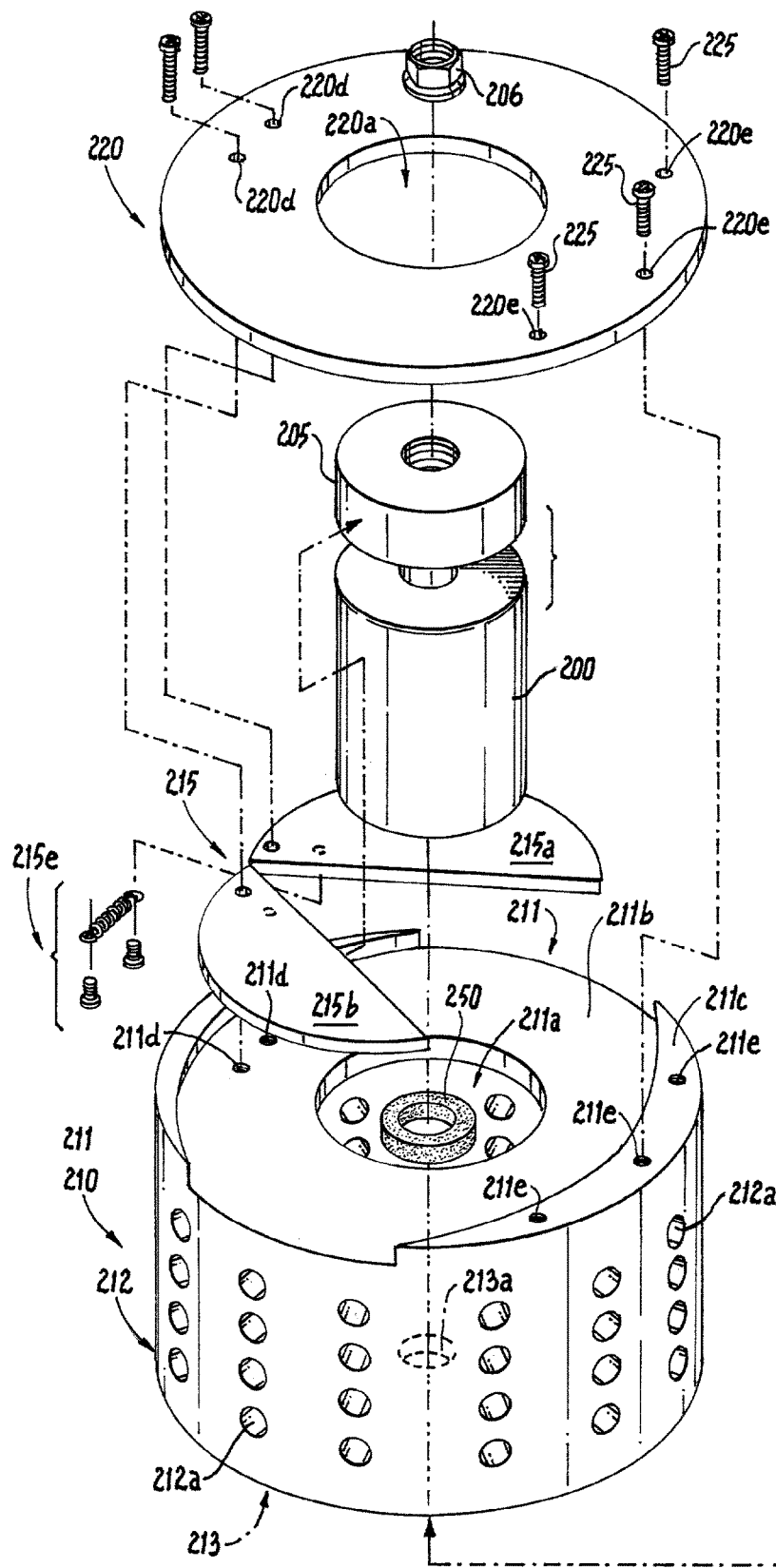
FIG. 4 is an exploded view of a disconnector assembly included in the electrical system of FIG. 1 according to one embodiment.
Figure 4:
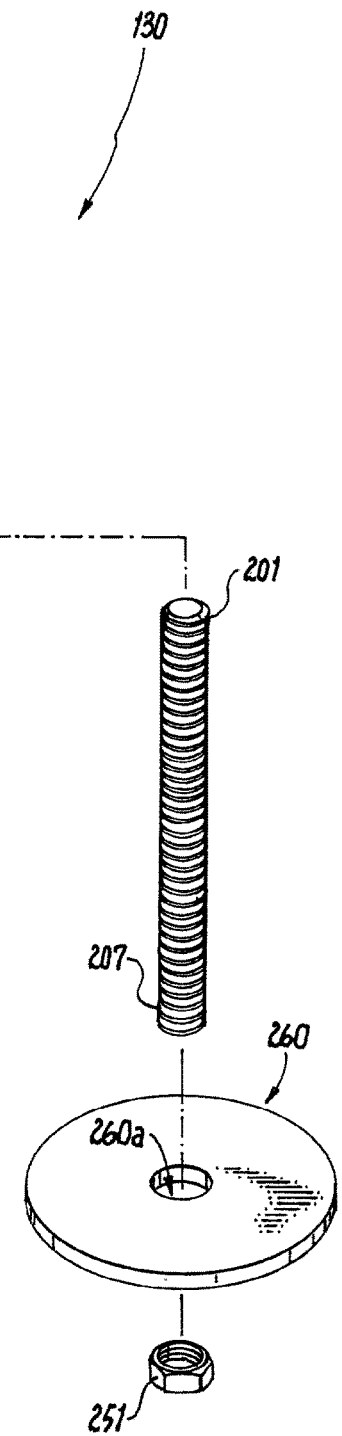

FIGS. 2-6 illustrate the disconnector assembly 130 according to some embodiments of the application. In particular, FIGS. 2 and 3 respectively illustrate side and top views of the disconnector assembly 130 under normal operating conditions of the electrical system 100. FIG. 4 illustrates an exploded view of the disconnector assembly 130 under normal operating conditions of the electrical system 100. As will be explained later, FIGS. 5 and 6 respectively illustrate side and top views of the disconnector assembly 130 after the disconnector assembly performs an operating function.

As illustrated in FIGS. 2-4, the disconnector assembly 130 may include an isolator 200, which includes a cartridge containing gunpowder or similar explosive material. The isolator 200 is electrically connected in series with the arrester 115 via the electrical wire 120. In particular, the electrical wire 120 may be electrically connected to the isolator 200 via a top terminal 201 of the isolator 200, which extends from an upper portion of the isolator 200. In some embodiments, the top terminal 201 is rigid and constructed from a conductive material, such as, but not limited to, copper or steel. The top terminal 201 may include threads and/or other mechanical features that enable mechanical fasteners, such as nuts and washers, to be mechanically fixed to the top terminal 201.

A slide out washer 205 may be mechanically fixed atop the isolator 200 such that the top terminal 201 of isolator 200 extends through the slide out washer 205. In some embodiments, the slide out washer 205 may have an outer perimeter that is less or greater in size than an outer perimeter of isolator 200. In some embodiments, the slide out washer 205 may have an outer perimeter that is approximately equal in size to an outer perimeter of isolator 200. An upper nut 206 may be threaded on, or otherwise mechanically coupled to, the top terminal 201 such that the slide out washer 205 is fixed in place atop an upper portion of the isolator 200. The isolator 200 may further be electrically connected to ground 135 via the ground wire 140. In particular, the ground wire 140 may be electrically connected to the isolator 200 via a bottom terminal 207 that extends from a lower portion of the isolator 200, wherein the bottom terminal 207 may be similar in shape and size to the top terminal 201.

The disconnector assembly 130 may further include a housing 210 that is configured to surround, enclose and/or otherwise shield the isolator 200. The housing 210 may include an upper surface 211, a side surface 212, which may include ventilation holes 212a, and a bottom surface 213. Although illustrated as having a generally cylindrical shape, in some embodiments, the housing 210 may be implemented in any one of a variety of shapes that may surround, enclose and/or otherwise shield the isolator 200. For example, in some embodiments, the housing 210 may be a rectangular box. The housing 210 may be constructed from materials such as metal, plastic, and/or wood. In some embodiments, the interior housing 210 is lined with fire resistant material and/or filled will fire quenching fluid and/or material.

The upper surface 211 of the housing 210 may include an opening 211a through which the top terminal 201 of isolator 200 and the slide out washer 205 extend. The opening 211a in the upper surface 211 of housing 210 may be large enough such that the isolator 200 and slide out washer 205 are capable of passing through the opening 211a without obstruction. As illustrated, the opening 211a may be a circular cutout in the upper surface 211 of the housing 210; however, in some embodiments, the opening 211a in the upper surface 211 of the housing may take the form of any shape that is desirable. The upper surface 211 of housing 210 may additionally include a recessed portion, such that the upper surface 211 of the housing 210 has first and second planar surfaces, 211b and 211c respectively. As illustrated by FIG. 4, the opening 211a formed in the upper surface 211 of the housing 210 may be formed in the first planar surface 211b of the upper surface 211, wherein the first planar surface 211b is the recessed portion of upper surface 211 of housing 210. The first planar surface 211b may be disposed at a lower elevation than the second planar surface 211c with respect to the side wall 212 of housing 210. In some embodiments, the upper surface 211 of housing 210 does not include a recessed portion. In such embodiments, the upper surface includes only one planar surface.

The upper surface 211 of housing 210 may further include a plurality of holes configured to enable a variety of disconnector assembly 130 components, such as a gripping mechanism, or shutter doors 215, and top plate 220, to be mechanically fastened to the upper surface 211. In particular, the first planar surface 211b may include a first plurality of fastening holes 211d, and the second planar surface 211c may include a second plurality of fastening holes 211e. In embodiments in which the upper surface 211 includes only one planar surface, the first and second plurality of fastening holes may be formed in the singular planar surface.

Figure 6:
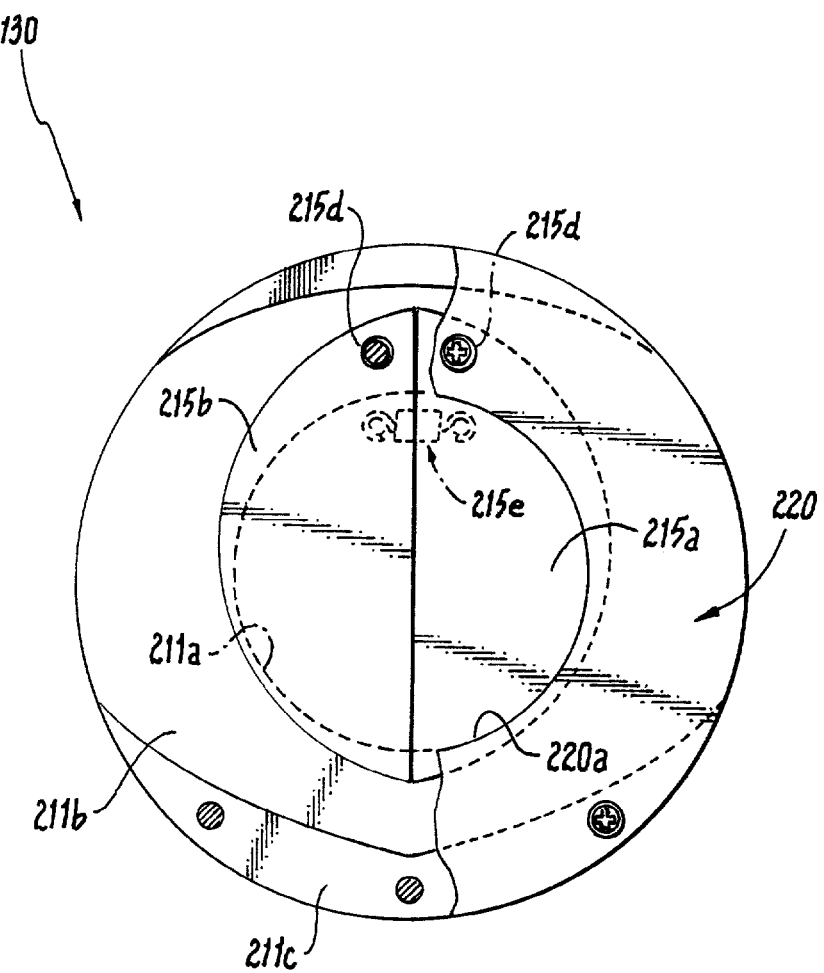
FIG. 6 is a top view of a disconnector assembly included in the electrical system of FIG. 1 after performing an operating function according to one embodiment.

The shutter doors 215 may include a first shutter door 215a and a second shutter door 215b. The shutter doors 215 are moveable between a variably open position, as illustrated by FIG. 3, and a closed position, as illustrated by FIG. 6. The shutter doors 215 may include a first plurality of fastening holes 215d that are configured to align with the first plurality of fastening holes 211d formed in the upper surface 211 of housing 210. In particular, when the shutter doors 215 are positioned atop the first planar surface 211b of upper surface 211, the shutter doors 215 may be mounted to the upper surface 211 via fasteners 225 that simultaneously extend through the first plurality of fastening holes 215d formed in the shutter doors 215 and the first plurality of fastening holes 211d formed in the first planar surface 211b of the upper surface 211 of housing 210. When mounted to the first planar surface 211b of upper surface 211, a top surface of the shutter doors 215 may be disposed below or flush with the second planar surface 211c of the upper surface 211 of the housing 210.

When mounted to the first planar surface 211b of upper surface 211, the shutter doors 215 remain operable to move between the variably open position and the closed position. When in the closed position, the shutter doors 215 are sized and shaped such that they are large enough to cover the opening 211a formed in the upper surface 211 of the housing 210. The shutter doors 215 may include a spring assembly 215e that is predisposed to hold the shutter doors 215 in the closed position. As illustrated by FIG. 4, the spring assembly 215e may include a spring (for example, an extension spring, a torsion spring, a leaf spring, or a compression spring), spring assembly holes formed in the shutter doors 215, and spring assembly fasteners configured to couple the spring to the shutter doors 215 via the spring assembly holes. The spring of spring assembly 215e may be disposed on top of or below the upper surface 211 of housing 210. For example, in some embodiments, the spring may be disposed between the top surface 211 and the shutter doors 215. In some embodiments, the spring may be disposed between the shutter doors 215 and a top plate 220 of the disconnector assembly 130. In some embodiments, the spring may be disposed inside of the housing 210.

When a tensile force is applied to the shutter doors 215 such that the first shutter door 215a and the second shutter door 215b are forced apart, as illustrated in FIGS. 2 and 3, the spring assembly 215e applies a compressive force that pulls the first shutter door 215a and the second shutter door 215b towards each other.

As described above, the disconnector assembly 130 further includes the top plate 220, which may be mounted atop the upper surface 211 of the housing 210. The top plate 220 may include an opening 220a through which the top terminal 201 of isolator 200 and the slide out washer 205 extend when the top plate 220 is mounted to the upper surface 211 of housing 210. Accordingly, the opening 220a formed in the top plate 220 may be large enough such that the isolator 200 and slide out washer 205 are capable of passing through the opening 220a without obstruction. In some embodiments, the opening 220a formed in the top plate 220 is of the same size and shape of the opening 211a formed in the upper surface 211 of the housing 210. In some embodiments, the top plate 220 has an outer perimeter that is equal or greater in size than an outer perimeter of the housing 210.

The top plate 220 may further include a first plurality of fastening holes 220d and a second plurality of fastening holes 220e for mounting the top plate 220 to the upper surface 211 of the housing 210. In particular, the first plurality of fastening holes 220d may be formed in the top plate 220 such that they align with the first plurality of fastening holes 211d formed in the first planar surface 211b of the upper surface 211 and the first plurality of fastening holes 215d formed in the shutter doors 215. The second plurality of fastening holes 220e may be formed in the top plate 220 such that they align with the second plurality of fastening holes 211e formed in the second planar surface 211c of the upper surface 211. When the top plate 220 is positioned such that it sits atop the second planar surface 211c of the upper surface 211, the top plate 220 may be mounted to the upper surface 211 via fasteners that simultaneously extend through the first plurality of fastening holes 220d formed in the top plate 220, the first plurality of fastening holes 215d formed in the shutter doors 215, and the first plurality of fastening holes 211d formed in the first planar surface 211b of the upper surface 211. Likewise, when the top plate 220 is positioned such that it sits atop the second planar surface 211c of the upper surface 211, the top plate 220 may be mounted to the upper surface 211 via fasteners that simultaneously extend through the second plurality of fastening holes 220e formed in the top plate 220 and the second plurality of fastening holes 211e formed in the second planar surface 211c of the upper surface 211.

Although the fasteners 225 are illustrated as being screws, it should be understood that the shutter doors 215 and top plate 220 may be mounted to the upper surface 211 of the housing by any fastening elements desired. For example, in some embodiments, the shutter doors 215 and/or top plate 220 may be mounted to the upper surface 211 of housing 210 via fastening elements such as pins, rivets, snaps, cable ties, bolts, or the like. Furthermore, although illustrated and described above as being separate components of the disconnector assembly 130, in some embodiments, the upper surface 211 of the housing 210, the shutter doors 215, and the top plate 220 are integrally formed as one component in the housing 210.

With reference to FIGS. 2 and 3, during normal operating conditions of the electrical system 100 (for example, when there are no power surges or overvoltage conditions present and the disconnector assembly has not performed an operating function), the housing 210 of disconnector assembly 130 may be installed by opening the shutter doors 215 and sliding the housing 210 over the isolator 200 such that the isolator 200 is contained within the housing 210 and the top terminal 201 and slide out washer 205 extend through the opening 211a formed in the upper surface 211 of the housing 210. The shutter doors 215 are configured to clamp, grip, and/or otherwise engage o the slide out washer 205 that is protruding through the opening 211a formed in the upper surface 211 of housing 210 via a compression force applied by the spring assembly 215e. Moreover, when the shutter doors 215 are in the variably open position and engaged with the slide out washer 205, the housing 210 is retained, or held in an upright position, by the compressive force applied by the spring assembly 215e onto the slide out washer 205 (e.g., as shown in FIG. 2). In some embodiments, the shutter doors 215 grip onto the isolator 200 itself. In some embodiments, the shutter doors 215 grip onto the top terminal 201.

When the housing 210 of disconnector assembly 130 is installed as described above, the isolator 200 is contained within the housing 210 such that the isolator 200 rests atop the bottom surface 213 of the housing 210, and the bottom terminal 207 of the isolator 200 extends through an opening 213a formed in the bottom surface 213 of the housing 210. The opening 213a formed in the bottom surface 213 of the housing 210 should be large enough such that the bottom terminal 207 of isolator 200 may extend through the opening 213a. However, the opening 213a formed in bottom surface 213 should also be small enough such that the isolator 200 is too large to pass through the opening 213a formed in the bottom surface 213. The isolator 200 may be supported by a second washer 250 that is positioned underneath the isolator 200 such that the bottom terminal 207 of the isolator 200 protrudes through the second washer 250 and an opening 213a formed in the bottom surface 213 of the housing 210. The second washer 250 may be composed of, for example, rubber. The isolator 200 may be further held in place atop the bottom surface 213 via a lower nut 251 that is threaded, or otherwise mechanically fixed, to a portion of the lower terminal 207 that extends out of the housing 210 through the opening 213a. In some embodiments, the disconnector assembly 130 further includes a bottom plate 260 that may be mounted underneath the bottom surface 213 of the housing 210. In such embodiments, the bottom plate 260 may be mounted to the bottom surface 213 of the housing 210 in a manner similar to that described above with respect to the mounting of the top plate 220. In some embodiments, the bottom plate 260 is integrally formed with the side surface 210 and/or bottom surface 213 of housing 210. The bottom plate 260 may include an opening 260a that enables the bottom terminal 207 of isolator 200 to extend through when the bottom plate 260 is mounted.

During normal operating conditions of the electrical system 100, the isolator 200 is surrounded by the housing 210. The top terminal 201 of the isolator 200 extends through the collective openings 211a and 220a formed in the upper surface 211 and top plate 220 respectively, enabling the electrical wire 120 to be electrically connected and mechanically fixed to the top terminal 201. The bottom terminal 207 of the isolator 200 extends through the opening 213a formed in the bottom surface 213 of the housing 210 (and optionally, if installed, the opening 260a formed in the bottom plate 260), enabling the ground wire 140 to be electrically connected and mechanically fixed to the bottom terminal 207. Therefore, the arrester 115 and disconnector assembly 130 combine to form an overvoltage protection assembly for electrical system 100. That is, when electrically connected, the arrester 115 and disconnector assembly 130 collectively provide an alternative path to ground 135 for current flowing through conductor 105 of the electrical system 100 when a fault, such as a power surge or transient fault, occurs in the electrical system 100. For example, when a power surge occurs in electrical distribution system 100, fault current flowing through conductor 105 may be diverted to ground 135 by flowing through the arrester 115 to prevent damaging electrical equipment of the electrical system 100. In particular, the fault current may flow through the arrester 115 to the isolator 200 via the electrical wire 120 and from the isolator 200 to ground 135 via the ground wire 140.

However, in some cases, the arrester 115 becomes overloaded by the fault current, which may be caused by a power surge, and fails to properly protect electrical equipment in the electrical system 100 from damage. When the arrester 115 fails, the resistance of arrester 115 may drop, causing an undesirable low impedance fault within electrical system 100. A failure in arrester 115 may be harmful to the health of electrical equipment in the electrical system 100 and/or the environment nearby the failing arrester 115. Thus, the disconnector assembly 130 may be configured to perform an operating function that electrically disconnects the arrester 115 from ground 135 upon the occurrence of an arrester 115 failure.

Figure 5:
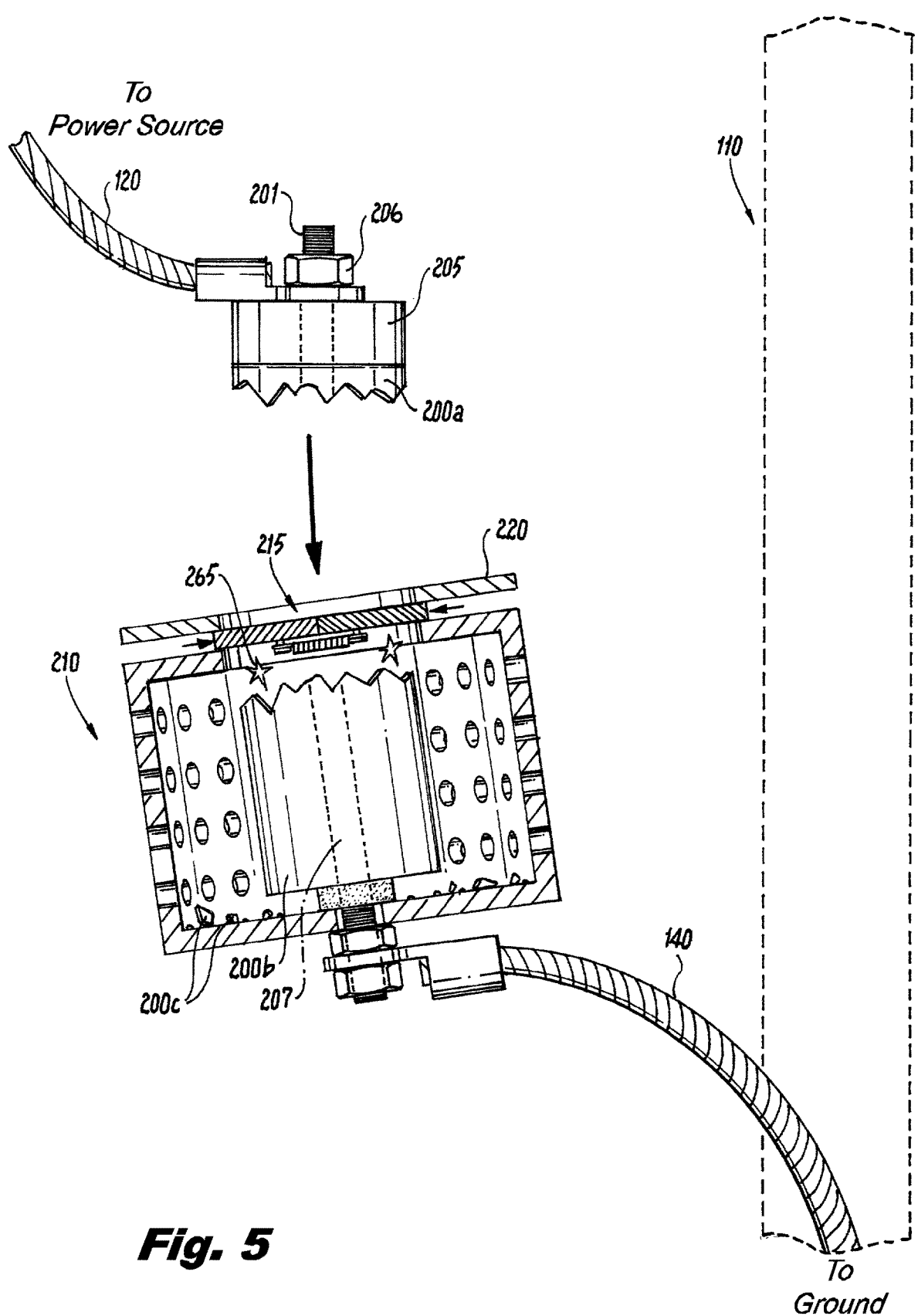
FIG. 5 is a side view of a disconnector assembly included in the electrical system of FIG. 1 after performing an operating function according to one embodiment.

The operating function of disconnector assembly 130 may be initiated when, for example, a voltage, a temperature, and/or a current in the isolator 200 exceeds a failure threshold that is associated with a failure in arrester 115. That is, an arrester 115 failure may cause an electrical parameter such as the voltage across, the temperature of, and/or current flowing through the isolator 200 to exceed a failure threshold, and thus, trigger the operating function of disconnector assembly 130. The operating function may include an ignition of the gunpowder and/or other explosive substance contained within the cartridge of isolator 200. When the gunpowder and/or other explosive substance ignites, an explosion occurs. As illustrated by FIG. 5, the explosion forces the isolator 200 to break into pieces, which may include an upper piece 200a, a bottom piece 200b, and harmful debris 200c. Furthermore, the explosion may generate sparks 265.

When the isolator 200 explodes into pieces 200a-c, the explosive force may be greater than the compressive force that enables the shutter doors 215 to grip onto the slide out washer 205 and hold the housing 210 in place. Accordingly, the shutter doors 215 are forced to disengage the slide out washer 210, such that the housing 210 slides downwards over the slide out washer 205, the upper piece 200a of the isolator 200 that is still attached to the top terminal 201, and electrical wire 120. As illustrated by FIGS. 5 and 6, when the housing 210 clears the slide out washer 205 and the upper piece 200a of the isolator 200 that is still attached to the top terminal 201 and electrical wire 120, the shutter doors 215 are forced to close by the spring assembly 215e. Accordingly, the harmful debris 200c generated by the explosion of isolator 200 is retained inside housing 210 and prevented from falling to the ground nearby. Furthermore, any sparks 265 generated by the explosion of isolator 200 are contained within the housing 210 and prevented from arcing to the ground or nearby objects. Therefore, the housing 210 is configured to contain the explosion of isolator 200 and prevent any debris 200c or sparks 265 generated by the explosion from starting a fire. In addition, the ventilation holes 212a formed in the side surface 212 of the housing 210 enable fumes and gases generated by the explosion to escape the housing 210 to prevent any further explosions from occurring. In some embodiments in which the housing 210 is lined and/or filled with fire quenching material, the fire quenching material further aids the housing 210 in subduing the explosion.

As illustrated by FIG. 5, the bottom terminal 207 of isolator 200 remains attached to the ground wire 140 after the isolator 200 explodes. As the ground wire 140 is attached to pole 110, the housing 210 of the disconnector assembly 130 is prevented from falling to the ground after the explosion. Rather, the housing 210 of the disconnector assembly 130, and components contained within, are supported by the ground wire 140 after the shutter doors 215 disengage the slide out washer 205. For example, the housing 210 may hang from the pole 110 by ground wire 140 until a service technician visits the site of the explosion. The disconnector assembly 130 may be reused after the isolator 200 explodes by replacing damaged components, such as the broken isolator 200, with new ones. Moreover, before reinstalling the disconnector assembly 130 in the electrical system 100, any debris 200c and remnants of the bottom piece 200b of the exploded isolator 200 may be removed from the housing 210. Likewise, the upper piece 200a of the exploded isolator 200 may also be removed from the electrical system 100.

What is claimed is:

1. An electrical system comprising:
   a conductor;
   a ground;
   an arrester electrically connected to the conductor; and
   a disconnector assembly electrically connected between the arrester and the ground; the disconnector assembly including:
      an isolator configured to perform an operating function in response to the occurrence of an event, the isolator including:
         a first terminal electrically connected to the arrester by a first wire, and
         a second terminal electrically connected to the ground by a second wire;
      a washer disposed on a top surface of the isolator; and
      a housing configured to surround the isolator, the housing including:
         a first opening through which the first terminal extends,
         a second opening through which the second terminal extends, and
         a retention mechanism configured to:
            hold the isolator in place relative to the arrester, engage the washer with a compressive force before the operating function occurs, disengage the washer in response to the occurrence of the operating function, and prevent egress from the housing through the first opening after disengaging the washer.

2. The electrical system of claim 1, wherein the operating function includes an ignition of explosive material included in the isolator.

3. The electrical system of claim 2, wherein the housing is configured to contain explosive debris generated by the ignition of the explosive material.

4. The electrical system of claim 1, wherein the second wire keeps the housing from contacting the ground upon the occurrence of the operating function.

5. The electrical system of claim 1, wherein the operating function electrically disconnects the arrester from the ground.

6. The electrical system of claim 1, wherein the event is an electrical failure in the arrester that causes current flowing through the isolator to exceed a threshold.

7. A disconnector assembly comprising:

an isolator configured to perform an operating function in response to the occurrence of an event, wherein performing the operating function includes an explosion of an explosive substance included in the isolator, the isolator including:
  a first terminal electrically connected to a protective device by a first wire, and
  a second terminal electrically connected to a ground by a second wire;
a washer disposed at a top surface of the isolator; and
a housing configured to surround the isolator, the housing including:
  a first opening through which the first terminal extends,
  a second opening through which the second terminal extends, and
  a gripping mechanism configured to engage the washer with a compressive force before the operating function occurs; and
wherein the gripping mechanism is configured to disengage the washer and cover the first opening after the operating function occurs.

8. The disconnector assembly of claim 7, wherein the compressive force applied by the gripping mechanism to the washer is configured to support the housing.

9. The disconnector assembly of claim 7, wherein the event includes a failure of the protective device that causes current flowing through the isolator to exceed a threshold.

10. The disconnector assembly of claim 7, wherein the second wire is configured to support the housing when the gripping mechanism disengages the washer.

11. The disconnector assembly of claim 7, wherein the gripping mechanism includes:
  gripping elements configured to engage the washer; and
  a spring configured to apply the compressive force to the gripping elements.

12. The disconnector assembly of claim 7, wherein the operating function includes electrically disconnecting the first terminal from the second terminal.

13. The disconnector assembly of claim 7, wherein an interior surface of the housing is lined with a fire quenching material.

* * * * *